United States Patent
Case et al.

(10) Patent No.: US 11,573,591 B2
(45) Date of Patent: Feb. 7, 2023

(54) MACHINE JOYSTICK WITH ERGONOMIC FEATURES

(71) Applicant: CATERPILLAR INC., Peoria, IL (US)

(72) Inventors: Michael D. Case, Elmwood, IL (US); Mihai Lazaroiu, Peoria, IL (US); Aaron R. Hayes, Hartsburg, IL (US); Brad R. Van De Veer, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 307 days.

(21) Appl. No.: 16/845,397

(22) Filed: Apr. 10, 2020

(65) Prior Publication Data
US 2021/0318713 A1 Oct. 14, 2021

(51) Int. Cl.
*G05G 9/047* (2006.01)
*B60N 2/75* (2018.01)
*E02F 9/20* (2006.01)

(52) U.S. Cl.
CPC ............. *G05G 9/047* (2013.01); *B60N 2/797* (2018.02); *E02F 9/2004* (2013.01)

(58) Field of Classification Search
CPC ......... G05G 9/047; G05G 2009/04774; G05G 2009/04777; G05G 2009/04781; G05G 1/06; B60N 2/797; E02F 9/2004; E02F 3/841; E02F 3/844; E02F 9/205
See application file for complete search history.

(56) References Cited

U.S. PATENT DOCUMENTS

| | | | |
|---|---|---|---|
| 5,042,314 A | 8/1991 | Rytter et al. |
| 6,148,593 A | 11/2000 | Heinsey et al. |
| 6,509,839 B2 | 1/2003 | Nagatuska |
| 7,497,298 B2 | 3/2009 | Shearer et al. |
| 8,100,218 B2 | 1/2012 | Case et al. |
| 8,212,770 B2 | 7/2012 | Obourn et al. |
| 8,276,476 B2 | 10/2012 | Diccion |
| 8,746,395 B2 | 6/2014 | Frazier et al. |
| 8,887,597 B2 | 11/2014 | Black |
| 9,777,460 B2 | 10/2017 | Wuisan et al. |
| 9,797,114 B2 | 10/2017 | Maifield et al. |

(Continued)

FOREIGN PATENT DOCUMENTS

EP 3115863 B1 8/2019
WO WO 2009/0483641 4/2009

*Primary Examiner* — Darlene P Condra

(57) ABSTRACT

An input device for performing control functions of a machine having a work tool may include a left-hand joystick mounted on a left armrest of an operator's seat, and a right-hand joystick mounted on a right armrest of an operator's seat. Each of the left-hand and right-hand joysticks may include a base portion configured to conform to and least partially cradle an operator's hand, a handle extending from the base portion with a proximal end of the handle being connected to the base portion, and a distal end of the handle supporting a head portion of the joystick. The head portion of the joystick may include a front surface including a configurable face plate. The configurable face plate may include one of a pair of upshift and downshift buttons or a roller configured to perform one of discrete or continuously variable shifting, respectively, of a transmission of the machine. The handle may include a thumb rest area at the distal end of the handle transitioning into the head portion of the joystick.

20 Claims, 7 Drawing Sheets

(56) References Cited

U.S. PATENT DOCUMENTS

| | | | | |
|---|---|---|---|---|
| 2002/0166267 | A1* | 11/2002 | McGugan | E02F 9/2004 37/348 |
| 2003/0038781 | A1* | 2/2003 | Hsu | G05G 9/04788 345/161 |
| 2009/0149709 | A1 | 6/2009 | Koitabashi | |
| 2011/0088961 | A1* | 4/2011 | Case | B62D 1/12 180/335 |
| 2012/0065847 | A1* | 3/2012 | Hobenshield | E02F 9/2004 701/50 |
| 2013/0173117 | A1* | 7/2013 | Bertsch | E02F 9/2012 701/41 |
| 2013/0306395 | A1* | 11/2013 | Frazier | G05G 5/03 180/333 |
| 2015/0253806 | A1* | 9/2015 | Astrom | G05G 5/05 74/471 XY |
| 2016/0145828 | A1* | 5/2016 | French | E02F 3/844 74/543 |
| 2017/0031382 | A1* | 2/2017 | Niguet | B66C 13/56 |
| 2018/0002893 | A1* | 1/2018 | Heinzmann | E02F 9/2012 |
| 2018/0067513 | A1* | 3/2018 | Kure | E02F 9/2004 |
| 2018/0341340 | A1* | 11/2018 | Larkin | G06F 1/169 |
| 2019/0359257 | A1* | 11/2019 | Johnson | E02F 9/2012 |
| 2021/0291951 | A1* | 9/2021 | Gai | B63H 25/02 |

\* cited by examiner

MACHINE JOYSTICK WITH ERGONOMIC FEATURES

TECHNICAL FIELD

The present disclosure relates generally to a joystick for a machine, and more particularly, to a machine joystick with improved ergonomic features.

BACKGROUND

Some earth moving machines, for example dozers, motor graders, wheel loaders, and snow plows, have a front-mounted work tool such as a blade, bucket, or plow for pushing or carrying material. These work tools can be tilted about a first horizontal axis that is generally perpendicular to the work tool (i.e., aligned with a travel direction), pitched about a second horizontal axis that is generally parallel to the work tool, and lifted relative to a ground surface. Tilting can be accomplished by extending a hydraulic cylinder located at a first side of the work tool, while simultaneously retracting a hydraulic cylinder located at an opposing side of the work tool. Pitching can be accomplished by extending or retracting both hydraulic cylinders in the same direction at the same time. Lifting of the work tool can be accomplished through extension of a separate lift cylinder. Existing hydraulic systems utilize different combinations of input devices to regulate the tilting, pitching, and lifting operations. Primary operator inputs for mobile vehicle motion include transmission direction (forward, neutral, or reverse), transmission speed setting, steering direction and magnitude, engine speed, and application of service brakes. Because there are multiple inputs to be controlled, these inputs generally require an operator of the machine to use both hands and both feet. In some existing dozers the transmission direction, transmission speed setting, and steering direction and magnitude are combined into a left-hand joystick. With a high idle machine such as a dozer, a right food pedal is often used to decelerate the engine speed from high idle toward a fully decelerated engine speed when slowing down the travel speed of the machine. A left foot pedal is often used in conjunction with the right foot pedal, with the left foot pedal controlling the service brakes for the machine.

When a machine is being controlled, either by an operator onboard the machine, or remotely, such as by a portable console which is hand-held or supported by a body harness, or at a remote operator station, which simulates the environment within a machine cab, in some implementations there may be two joysticks, with the left joystick being used for control of transmission speed settings and steering, and the right joystick being used for control of a blade or other work tool. In some implementations with a remote control console the operator must control all functions of the machine with two hands and no foot pedals. The left joystick may have two or more control axes, with a left-right axis being used for steering direction and magnitude, and a front-back axis being used to set transmission direction. The joystick may also have a vertical axis about which it can be rotated, with rotation of the joystick about the vertical axis resulting in changes to the transmission speed settings. Conventional remote control consoles may include fingertip-controlled paddles that are used by the operator in place of a decelerator foot pedal and a service brake foot pedal. An exemplary remote control system for a work machine is disclosed in U.S. Pat. No. 8,428,791 to Carlsson, issued on Apr. 23, 2013 (the '791 patent). Specifically, the '791 patent discloses a remote control system for a machine, with the system including at least one control stick or joystick and a number of buttons, levers, and/or knobs for operating the different travel and working functions of the machine.

Although the remote control system of the '791 patent includes joysticks and other input devices having different functions in different modes, the '791 does not disclose a control system that includes a joystick with the improved ergonomic, comfort, and accessibility features of the joystick according to this disclosure. The joystick designs of the present disclosure change the shape and configuration of each joystick used in conventional designs in very specific ways such that an operator using the modified joystick experiences a more comfortable and ergonomic feel with easy access to control buttons and wheels arranged on the faceplate of the joystick. The disclosed joystick configuration enables accurate positioning of the joystick, for example, using just the thumb of the left hand to move the joystick forward, or using just fingertips touching flat surfaces on the sides of the joystick to move the joystick in left and right directions, while easily accessing controls on the faceplate of the joystick without experiencing fatigue during extended periods of operating the machine using the joystick.

The joystick designs according to the present disclosure address one or more of the needs set forth above and/or other problems of the prior art.

SUMMARY

In one aspect, the present disclosure is directed to an input device for performing control functions of a machine having a work tool. The input device may include a left-hand joystick mounted on a left armrest of an operator's seat and a right-hand joystick mounted on a right armrest of an operator's seat. Each of the left-hand and right-hand joysticks may include a base portion that may be configured to conform to and least partially cradle an operator's hand. Each of the joysticks may include a handle extending from the base portion with a proximal end of the handle being connected to the base portion, and a distal end of the handle supporting a head portion of the joystick. The head portion of the joystick may comprise a front surface including a configurable face plate. The configurable face plate may include a roller configured to perform continuously variable up and down shifting of a transmission of the machine. The handle may include a thumb rest area at the distal end of the handle transitioning into the head portion of the joystick and a thumb relief area defined into a side lower portion of the head portion and configured to provide clearance for a thumb of the operator's hand when the operator is gripping the handle as the thumb is moved from the thumb rest area into contact with one or more buttons or rollers disposed on the face plate.

In another aspect, the present disclosure is directed to an input device for a motor grader. The input device may include a left-hand joystick mounted on a left armrest of an operator's seat in a cab of the motor grader, wherein the left-hand joystick is configured for generating signals indicative of an operator's commands for at least one of shifting of transmission speeds and direction, change in travel speed of the motor grader, articulation of the motor grader, an amount of wheel lean on front wheels of the motor grader, steering of the motor grader, or movement of a left blade of the motor grader. The input device may further include a right-hand joystick mounted on a right armrest of an operator's seat in the cab of the motor grader, wherein the right-hand joystick is configured for generating signals indicative of an operator's commands for at least one of changes to throttle controls for acceleration and deceleration of the motor grader, movements of a right blade of the motor grader, rotation of a circle and moldboard of the motor grader, side shifting of the circle and a drawbar of the motor grader, or additional controls of work tools of the motor grader including a snow wing. Each of the left-hand and right-hand joysticks may include a base portion that may be configured to at least partially support an operator's hand, a handle extending from the base portion with a proximal end of the handle being connected to the base portion, and a distal end of the handle supporting a head portion of the joystick. The head portion of each of the joysticks may comprise a front surface including an interchangeable face plate. The interchangeable face plate may include a roller configured to perform continuously variable up and down shifting of a transmission of the machine and additional buttons configured to control other functional aspects of the motor grader. The handle of each of the joysticks may include a thumb rest area at the distal end of the handle transitioning into the head portion of the joystick and flat portions along each of left and right sides of the handle configured to enable leftward and rightward movement of the joystick with an operator's fingertips. The head portion of each joystick may include a top flat surface configured for use as a rest surface for an operator's hand during movement of the joystick.

In yet another aspect, the present disclosure is directed to a machine having a work tool and an input device. The input device may include a base portion that may be configured to conform to and least partially cradle an operator's hand. The input device may include a handle extending from the base portion with a proximal end of the handle being connected to the base portion, and a distal end of the handle supporting a head portion of the input device. The head portion of the input device may comprise a front surface including a configurable face plate. The configurable face plate may include a roller configured to perform continuously variable up and down shifting of a transmission of the machine. The handle may include a thumb rest area at the distal end of the handle transitioning into the head portion of the input device and a thumb relief area defined into a lower side edge of the head portion and configured to provide clearance for a thumb of the operator's hand when the operator is gripping the handle as the thumb is moved from the thumb rest area into contact with one or more buttons or rollers disposed on the face plate.

DETAILED DESCRIPTION

Figure 1:
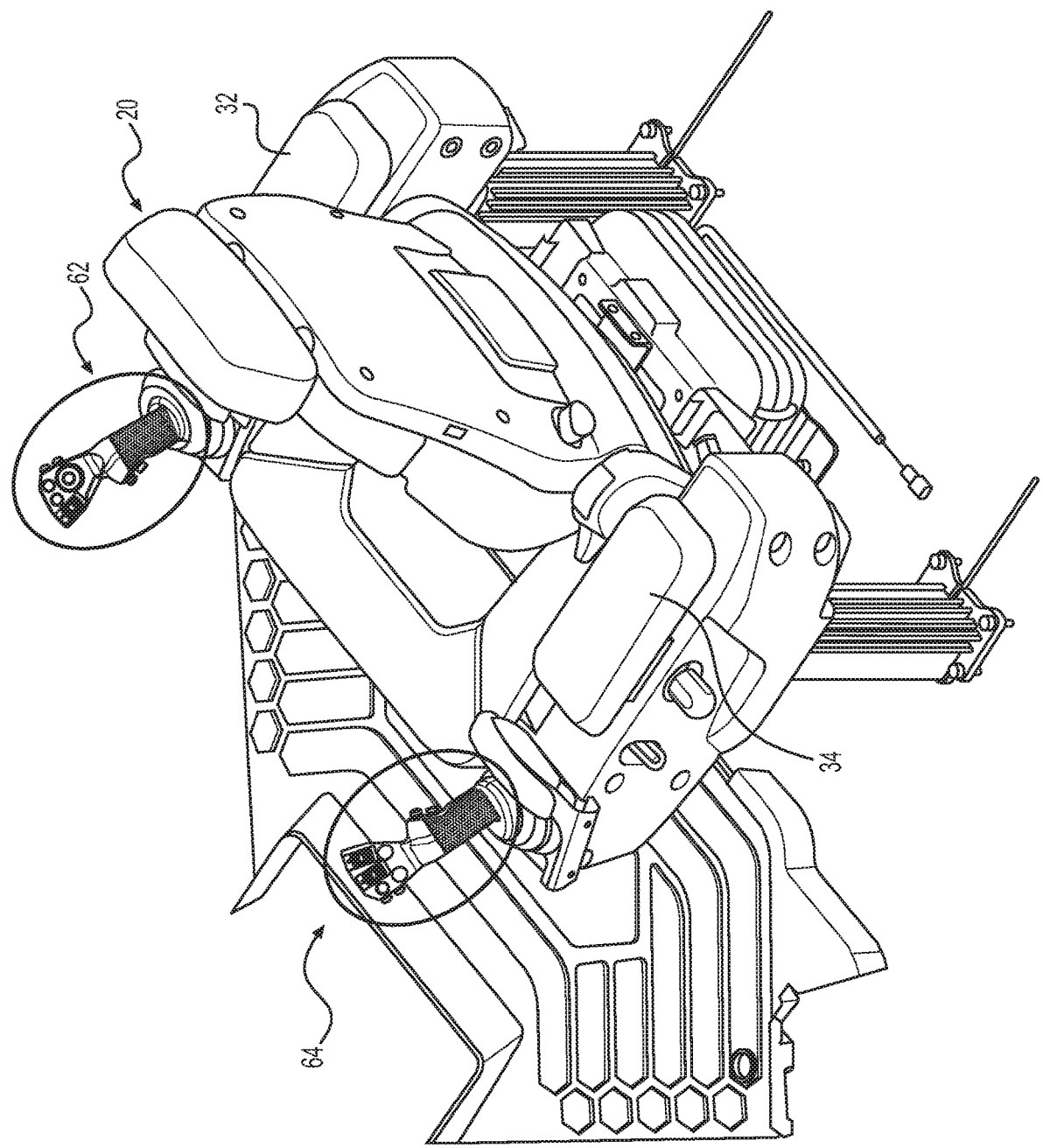
FIG. 1 is a perspective view of an exemplary operator's seat including left-hand and right-hand joysticks of an input device according to an embodiment of this disclosure.

FIG. 1 illustrates an exemplary input device comprising a left-hand joystick 64 mounted on a left arm 34 of an operator's seat 20, and a right-hand joystick 62 mounted on a right arm 32 of the operator's seat 20. The exemplary input device may be used in controlling various operational functions of a machine having multiple systems and components that cooperate to accomplish a task. The machine controlled by the input device including left-hand joystick 64 and right-hand joystick 62 may embody a mobile machine that performs some type of operation associated with an industry such as mining, construction, farming, transportation, or another industry known in the art. For example, an exemplary machine may be a material moving machine such as a dozer, a motor grader, a wheel loader, a snowplow, or similar machine. The machine may include an implement system configured to move a work tool, a drive system for propelling the machine, a power source that provides power to the implement system and drive system, and an operator station that provides for control of the implement system, drive system, and/or power system.

The implement system may include a linkage structure acted on by fluid actuators or other types of actuators to move a work tool. Specifically, the implement system may include a push frame, centershift linkbar, or other fixturing component, assembly, or rig that is connected to a drive system and an edge or other portion of a work tool such as a moldboard on a motor grader. In some implementations, one or more hydraulic cylinders (lift cylinders) may pivotally connect the push frame to a machine frame and be functional to raise and lower the work tool relative to a ground surface. Additional hydraulic cylinders (referred to as yaw cylinders) may pivotally connect the push frame to opposing side edges of the work tool and be functional to yaw the work tool about a vertical axis. Still further linkage members and hydraulic cylinders or other actuators may connect the push frame to other portions of a work tool and be functional to roll the work tool about a horizontal axis. In the case of a motor grader, left-hand joystick 64 mounted on left armrest 34 of operator's seat 20 in a cab of the motor grader may be configured for generating signals indicative of an operator's desired shifting of transmission speeds and direction, change in travel speed of the motor grader, articulation of the motor grader, an amount of wheel lean, steering of the motor grader, and movement of a left blade of the motor grader. Right-hand joystick 62 mounted on right armrest 32 of operator's seat 20 may be configured for generating signals indicative of an operator's desired changes to throttle controls for acceleration and deceleration of the motor grader, movements of a right blade, rotation of a circle and moldboard, side shifting of the circle and a drawbar of the motor grader, and additional controls of components including snow wings and other work tools.

Figure 2:
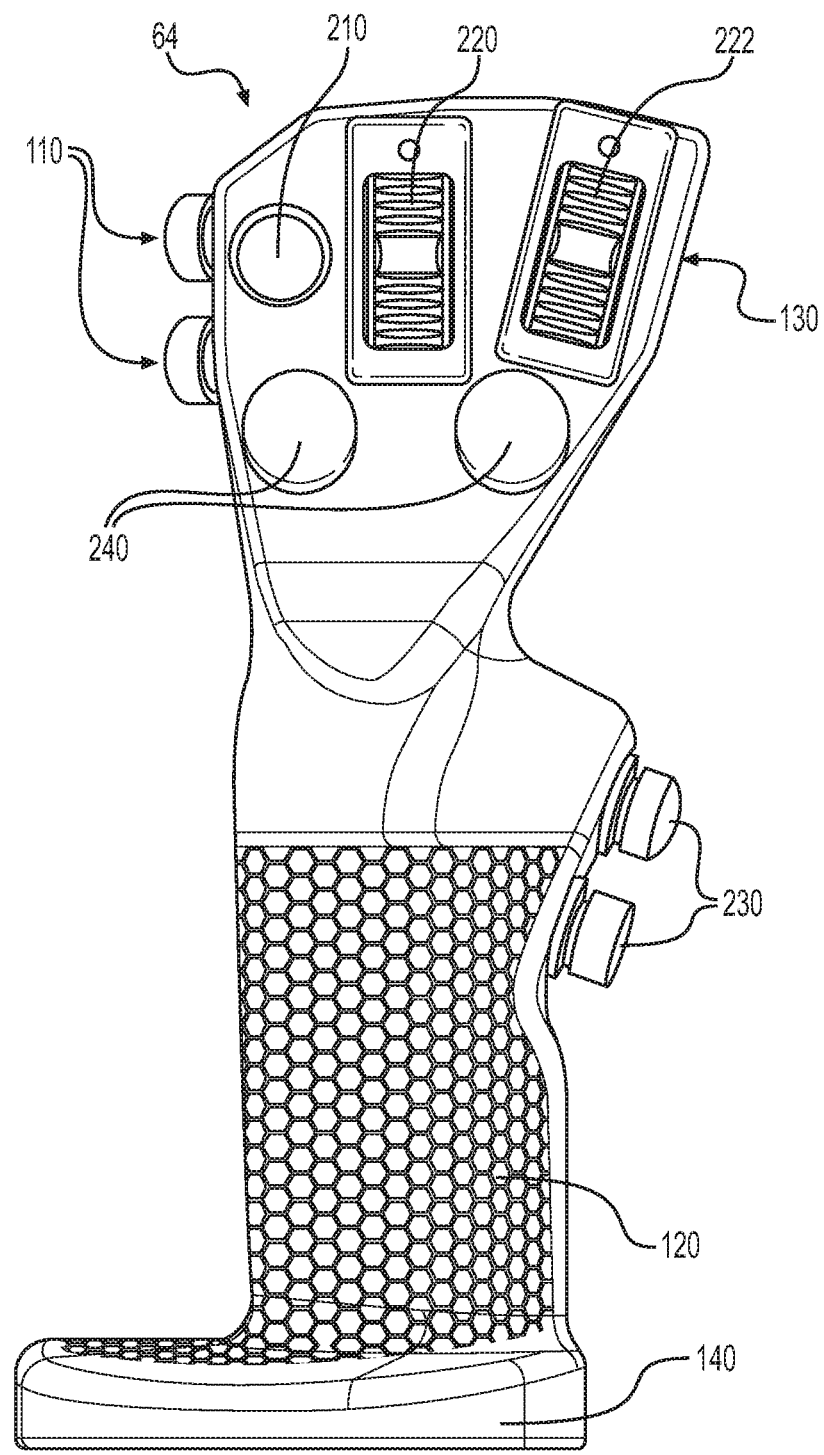
FIG. 2 is a front pictorial illustration of a first embodiment of the exemplary disclosed left-hand joystick shown in FIG. 1.
Figure 4:
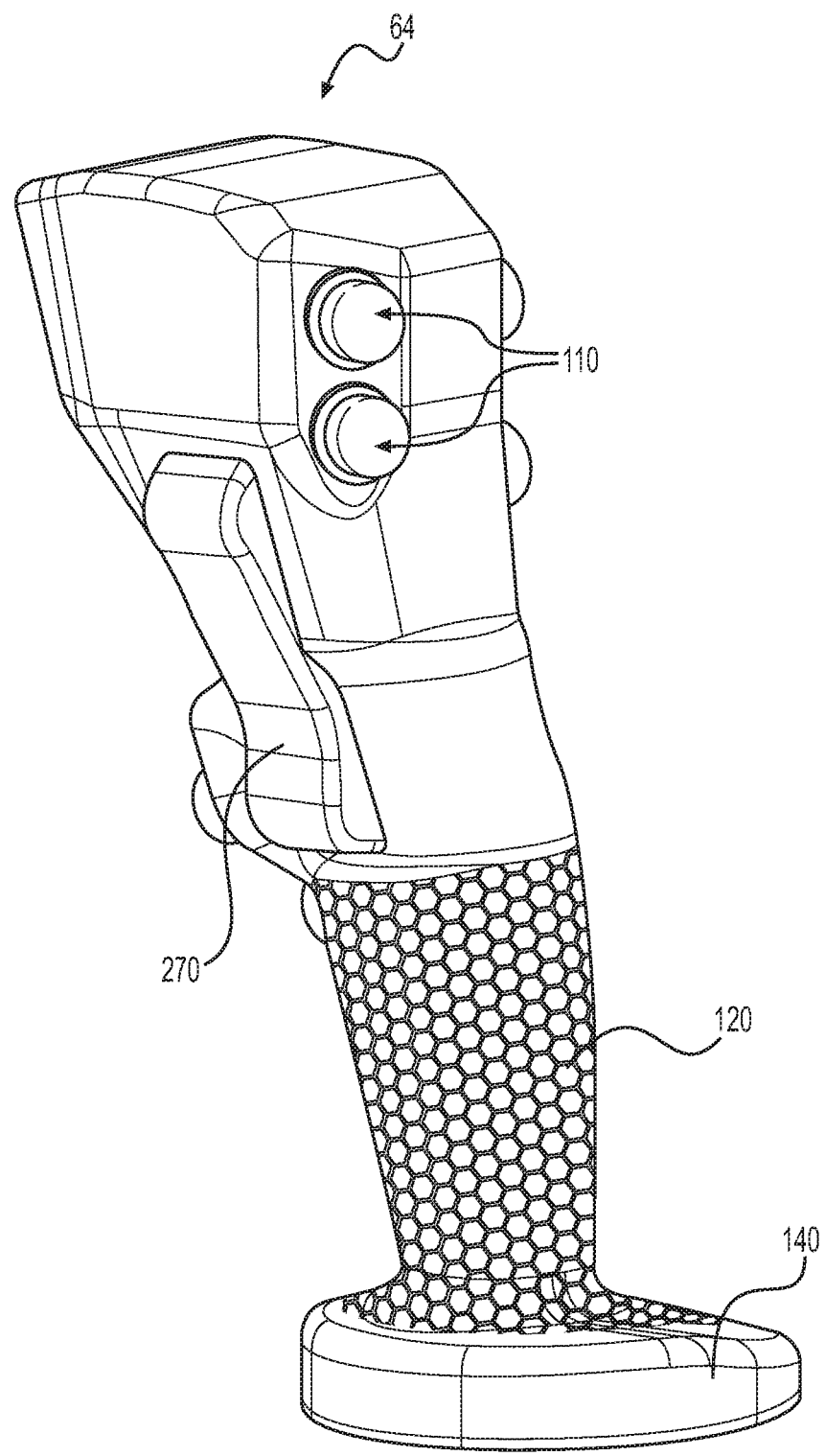
FIG. 4 is a side perspective view of the exemplary disclosed left-hand joystick shown in FIG. 2.
Figure 6:
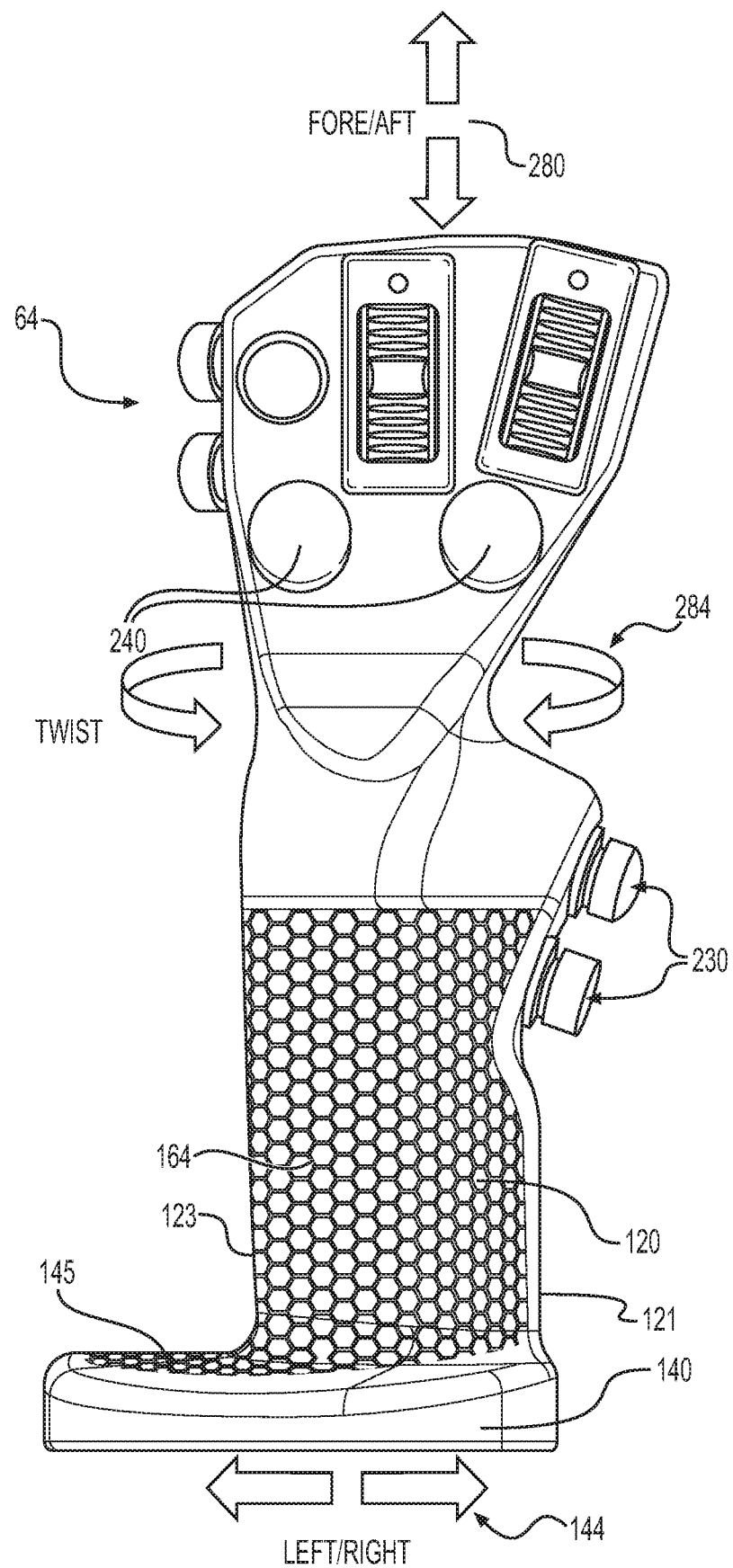
FIG. 6 is another front pictorial illustration of the first embodiment of the exemplary disclosed left-hand joystick shown in FIG. 2.

As shown in FIGS. 2, 4, and 6, left-hand joystick 64 may include a base portion 140 that may be configured to at least partially support an operator's hand, a handle 120 extending from base portion 140 with a proximal end of handle 120 being connected to base portion 140, and a distal end of handle 120 supporting a head portion 130 of left-hand joystick 64. Head portion 130 of left-hand joystick 64 may comprise a front surface including a configurable face plate. The configurable face plate may include a first roller 220 configured to perform continuously variable up and down shifting of a transmission of the machine. A second roller 222 may be disposed adjacent first roller 220 on the configurable face plate of head portion 130 of left-hand joystick 64, with second roller 222 being configured to perform a function such as grade control using a snow wing of the motor grader. A button 210 on the face plate of head portion 130 may be used to perform a function such as return to center after articulation control of the motor grader. Articulation control of the motor grader may be accomplished as shown in FIG. 6 by twisting handle 120 about a vertical axis extending up through the joystick, with the twisting motion represented by the arrows 284. Additional buttons 240 on the configurable face plate of head portion 130 of left-hand joystick 64 may be used to perform functions such as control of the amount of wheel lean on front wheels of the motor grader. Buttons 110 disposed on a left side of head portion 130 of left-hand joystick 64 may perform other control functions. Buttons 230 disposed on a right side of handle 120 of left-hand joystick 64 may be used to perform functions such as grade control using snow wings on the motor grader. The handle may include a thumb rest area at the distal end of handle 120 transitioning into head portion 130 of left-hand joystick 64 and a thumb relief area may be defined into a lower side portion of head portion 130 and configured to provide clearance for a thumb of the operator's hand when the operator is gripping the handle as the thumb is moved from the thumb rest area into contact with one or more buttons or rollers disposed on the face plate.

Reference to a "configurable face plate" on head portion 130 of left-hand joystick 64 means that the face plate is designed as an interchangeable faceplate to allow for using the same joystick on multiple different machines by interchanging the face plate with different face plates that fit head portion 130 and have openings for different buttons, rollers, or other switches in different locations on the head portion in order to perform different functions associated with the different machines. As shown in FIG. 6, handle 120 may be provided with a very specific shape around the outside and to the front of a gripping portion of handle 120, including flat surfaces 121, 123 on both sides of handle 120. Flat surfaces 121, 123 may allow an operator to grip joystick 64 with the fingertips of the left hand for small, precise left-right motions 144, without having to grip the entire handle. The left-right motions of left-hand joystick 64 may be used to generate signals indicative of an operator's desired steering of the motor grader. Base portion 140 may include a top surface 145 configured to conform to the shape of a user's palm when the user is gripping handle 120. Top surface 145 may be configured with a change in shape toward the rear of joystick 64 to allow space for the natural bulge on the outside of a user's hand when gripping handle 120. The shape of top surface 145 is designed to remove any pressure points and improve comfort for a user. The shape of the gripping portion of handle 120 may also be formed with a curvature that provides improved comfort across a wide range of hand sizes. The gripping portion of handle 120 may also include an embossed pattern 164, as shown in FIG. 6. The pattern 164 may be in the form of hexagonal shaped chamfers, or other variations to the surface of the gripping portion of handle 120 which may improve gripping of the handle, improve comfort, assist with the removal of moisture, and improve the appearance of the joystick. The side geometry of handle 120 may blend into the front of joystick 64 to create a defined grip area that enables a user to twist handle 120, as represented by arrows 284 in FIG. 6, with minimal effort. Additional functions may be performed by additional buttons 110 on a side of head portion 130 of left-hand joystick 64 and by a rocker switch 270 on a back side of handle 120, as shown in FIG. 4. A top surface 152 of head portion 130 of right-hand joystick 62 and of head portion 132 of left-hand joystick 64 may also be provided with a flat and smooth geometry that allows an operator to rest their hand on the top of the joystick while performing various machine operations. The top surface may be provided with a wide and flat geometry that enables a comfortable rest position for an operator's hand.

Figure 3:
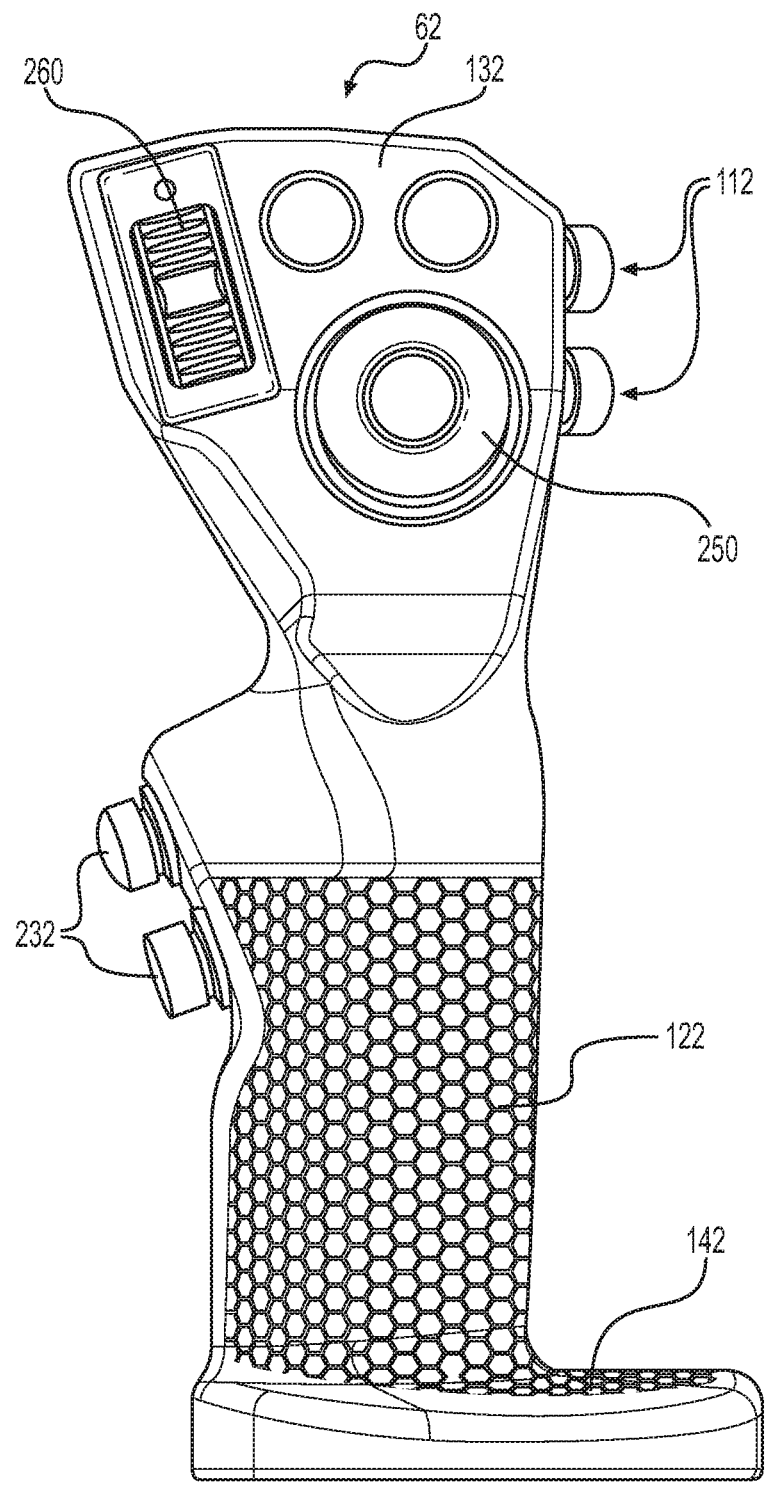
FIG. 3 is a front pictorial illustration of a first embodiment of the exemplary disclosed right-hand joystick shown in FIG. 1.
Figure 5:
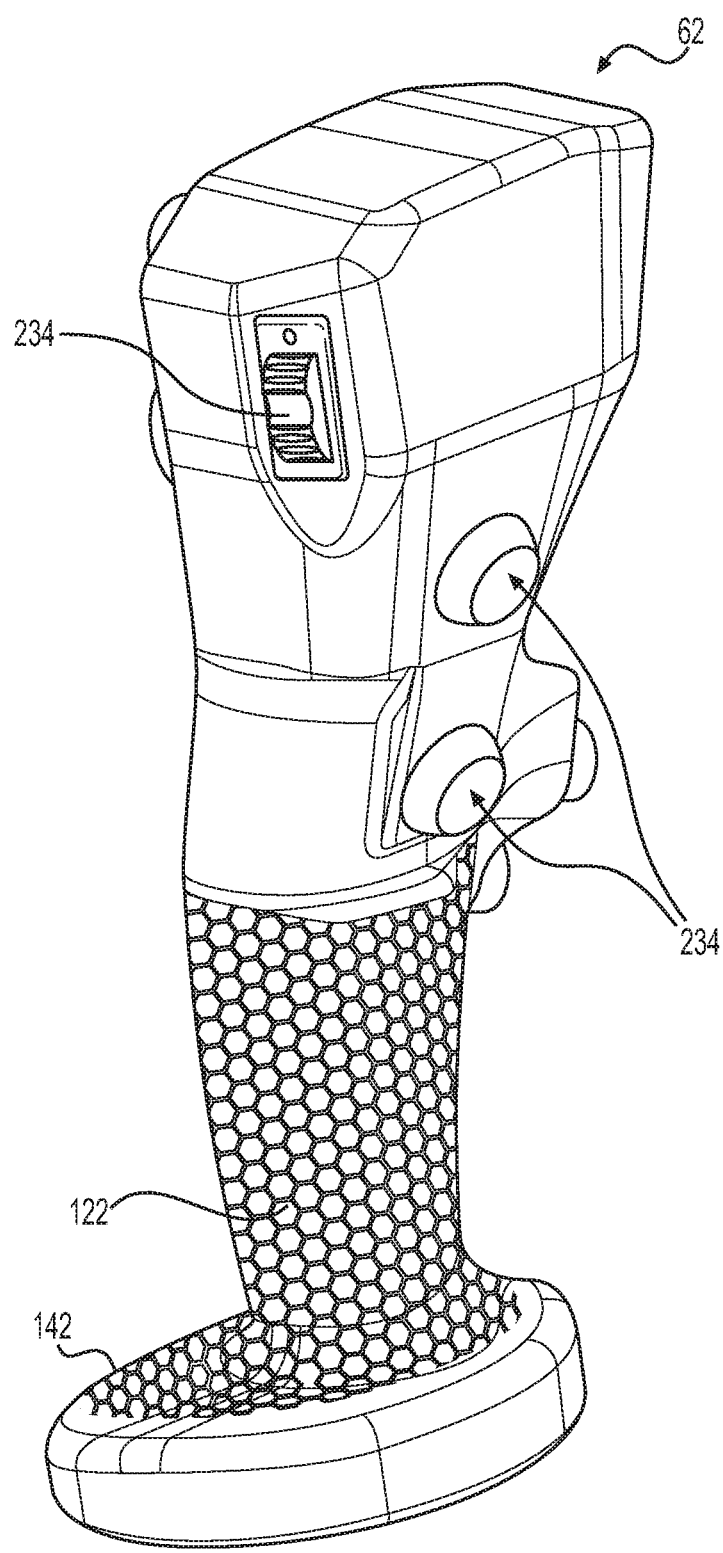
FIG. 5 is a side perspective view of the exemplary disclosed right-hand joystick shown in FIG. 3.
Figure 7:
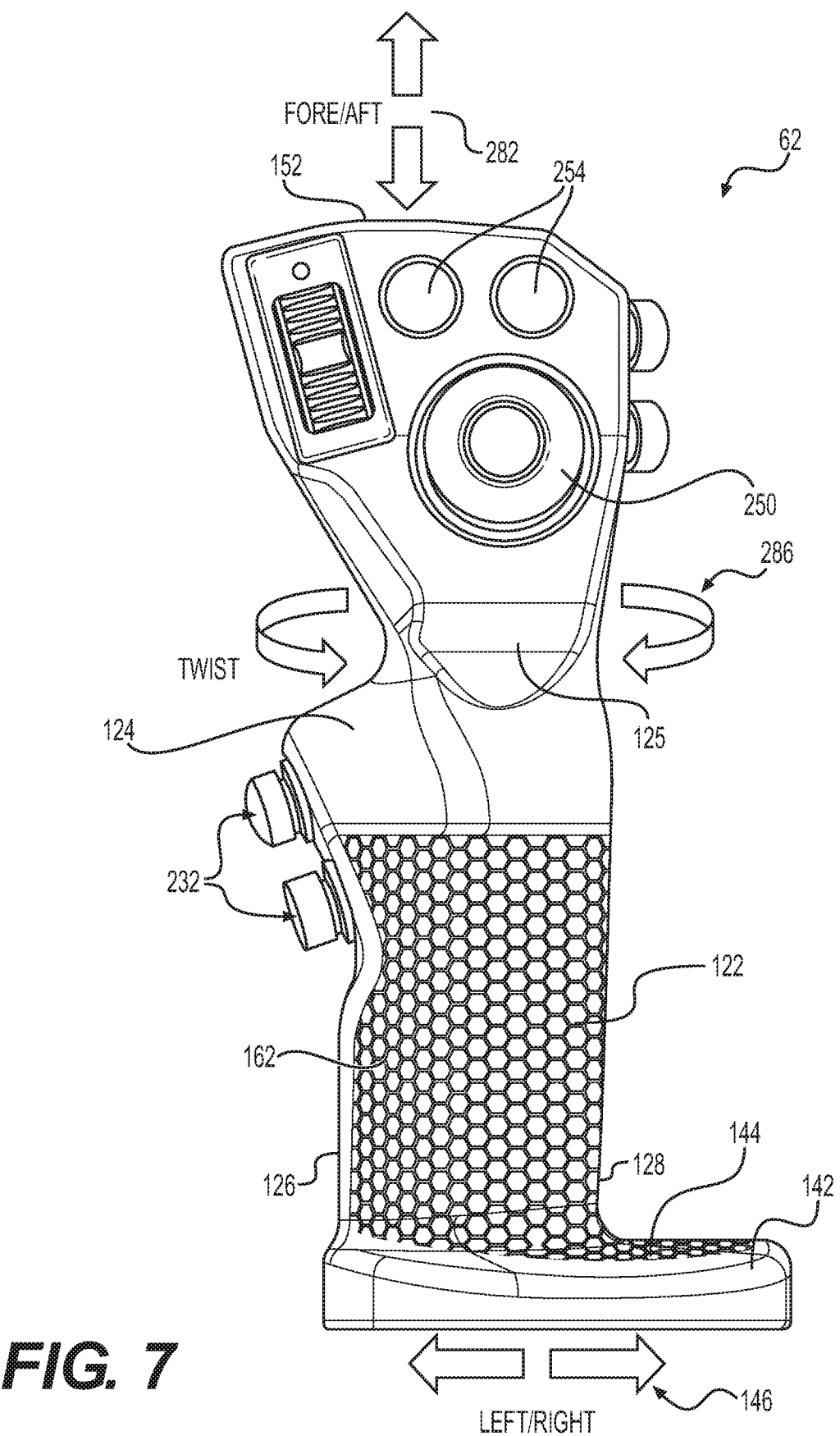
FIG. 7 is another front pictorial illustration of the first embodiment of the exemplary disclosed right-hand joystick shown in FIG. 3.

As shown in FIGS. 3, 5, and 7, right-hand joystick 62 may include a base portion 142 that may be configured to at least partially support an operator's hand, a handle 122 extending from base portion 142 with a proximal end of handle 122 being connected to base portion 142, and a distal end of handle 122 supporting a head portion 132 of right-hand joystick 62. Head portion 132 of right-hand joystick 62 may comprise a front surface including a configurable face plate. The configurable face plate may include a roller 260 configured to perform grade control with a work tool such as a snow wing of a motor grader, similar to second roller 222 of left-hand joystick 64. A 4-way switch and push button 250 on head portion 132 of right-hand joystick 62 may be used to perform functions such as centershift control of a drawbar and circle and moldboard of a motor grader. Handle 122 of right-hand joystick 62 may be twisted about a vertical axis extending up through joystick 62, with the twisting motion represented by arrows 286 in FIG. 7. This twisting action may be used to control movement of the circle and moldboard of a motor grader. A thumb rest area 124 and thumb activation area 125 may be defined at the transition between handle 122 and head portion 132 of right-hand joystick 62. The thumb rest area 124 may be designed to follow the curvature of the right hand and thumb of an operator when in the natural resting position while loosely gripping handle 122. Additionally, a lower edge of the face plate on head portion 132 may be recessed with a concave profile in order to remove any sharp edges that may interfere with transitioning the thumb from thumb rest area 124 to any of the thumb activated buttons or switches on head portion 132. Thumb rest area 124 may also improve controllability of right-hand joystick 62 and reduce stress in the operator's hand when twisting handle 122, as represented by arrows 286. Buttons 232 disposed on a left side of handle 122 of right-hand joystick 62 may be used to perform functions of grade control using right side snow wings on the motor grader, just as buttons 230 on the right side of handle 120 of left-hand joystick 64 may be used to perform functions of grade control using left side snow wings on the motor grader. The gripping portion of handle 122 of right-hand joystick 62 may also be provided with an embossed pattern 162, as shown in FIG. 7. The patterns 164, 162 may be in the form of hexagonal shaped chamfers, or other variations to the surface of the gripping portion of the handles which may improve gripping of the handle, improve comfort, assist with the removal of moisture, and improve the appearance of the joysticks.

Thumb activation area 125 at the distal end of handle 122 transitioning into head portion 132 of right-hand joystick 62 also provides a position at which the right thumb can be pressed against joystick 62 in a forward direction at a greater distance from base portion 142 than the gripping portion of handle 122 in order to increase lever action and reduce the amount of effort needed to move joystick 62 forward as compared to pressing forward on the gripping portion of handle 122. This feature enables an operator to make very small and precise movements of handle 122 in a forward direction. Forward and rearward movement of handle 122 of joystick 62, as represented by arrows 282 in FIG. 7, may be used to generate signals indicative of a desired amount of movement of a right blade of a motor grader in lifting and lowering directions. Similarly, forward and rearward movement of handle 120 of left-hand joystick 64, as represented by arrows 280 in FIG. 6, may be used to generate signals indicative of a desired amount of movement of a left blade of the motor grader in lifting and lowering directions. Additional functions may be performed by additional buttons 234 and roller 234 disposed on right-hand joystick 62, as shown in FIG. 5. As shown in FIG. 7, handle 122, like handle 120, may be provided with a very specific shape around the outside and to the front of a gripping portion of handle 122, including flat surfaces 126, 128 on both sides of handle 122. Flat surfaces 126, 128 may allow an operator to grip joystick 62 with the fingertips of the right hand for small, precise left-right motions, without having to grip the entire handle. The left-right motions of right-hand joystick 62 may be used to generate signals indicative of a desired amount of side shifting of a drawbar, circle and moldboard of a motor grader.

In some exemplary embodiments of a machine including joysticks 62, 64, the machine may include an arm configured to extend vertically upward away from a center of a push frame toward an upper edge of a work tool, and a hydraulic cylinder (pitch cylinder) may pivotally connect a distal tip of the arm to the upper edge. The pitch cylinder may be functional to pitch the work tool of the machine about a horizontal axis that is generally perpendicular to an axis aligned or parallel with a travel direction of the machine. An additional hydraulic cylinder (roll cylinder) may extend from the distal tip of the arm to a point on the work tool located between the arm and a side edge of the work tool. The roll cylinder may be functional to roll the work tool about a horizontal axis. The horizontal axis may be generally aligned with or parallel to the travel direction of the machine.

Numerous different work tools may be attachable to a single machine and operator controllable. A work tool may include any device used to perform a particular task such as, for example, a blade, a bucket, a plow, or another task-performing device known in the art. The work tool could additionally slide, swing, open and close, or move in another manner known in the art.

A drive system of the machine may include various configurations including opposing undercarriage assemblies, each having a sprocket driven by a power source to rotate a corresponding endless track. Each undercarriage assembly may also include a base member operatively connected to the sprocket and/or push frame to support the ends of the push frame. It is contemplated that the drive system could alternatively include traction devices other than tracks, if desired, such as wheels, belts, or other known traction devices.

A power source for the machine may embody an engine such as, for example, a diesel engine, a gasoline engine, a gaseous fuel-powered engine, or any other type of combustion engine known in the art. It is contemplated that the power source may alternatively embody a non-combustion source of power such as a fuel cell, a power storage device, or another known source. The power source may produce a mechanical or electrical power output that is used to propel the machine via a drive system and that can be converted to hydraulic power for moving various hydraulic cylinders that actuate different members of the machine supporting the work tool, and the work tool itself.

An operator station or remote control console may include input devices that receive input from a machine operator indicative of desired machine maneuvering. Specifically, an operator station may include one or more input devices such as joysticks 62, 64 located proximate operator's seat 20. The input devices may be manipulated by an operator to control movement of a machine, one or more articulable members of the machine, or a work tool of the machine by producing proportional displacement signals that are indicative of desired maneuvering. As discussed above, joysticks 62, 64 may be associated with control of lifting, pitching, rolling, and yawing movements of a work tool, and/or changing direction and speed of a transmission of the machine, changing a travel speed of the machine, and/or steering the machine.

The specific shapes of handle 120 of left-hand joystick 64 and handle 122 of right-hand joystick 62 around the outside of the portions of the handles that will be gripped by an operator, and toward the front side of the handles may be configured to achieve a number of different purposes. The outside peripheral surface of the gripping portion of each handle may be configured with a slight curvature to provide improved comfort across a wide range of hand sizes and palm shapes. The side surfaces of the gripping portion are configured with geometries that blend into the front surface of the joystick and define the gripping portion that allows an operator to twist the joystick with a minimal amount of effort. The front surfaces of the joysticks may also be configured to blend into the flared base portion of the handle in a configuration designed to match the natural curvature of a human hand, and relieve a potential pressure point on the palm and little finger of an operator's hand.

The outside of base portion 140 of left-hand joystick 64 and base portion 142 of right-hand joystick 62 may also change shape toward the rear of each joystick to allow space for the bulge on the outside of a hand when gripping the respective handles 120, 122. In preferred configurations, the outer peripheral surfaces of the base portions of the joysticks and the transition from the base portions to the respective handles may be provided with clearance to remove any potential pressure points and improve comfort.

Thumb rest areas, such as thumb rest 124 on right-hand joystick 62 may be designed to follow the curvature of the hand and thumb when in the natural resting position, thereby reducing fatigue that may otherwise result over extended periods of time when an operator is pressing on the joystick using only the thumb for more delicate maneuvers. Head portion 132 may also be provided with a recessed portion on a lower edge of the head portion adjacent the thumb rest to allow space and positioning for quick access to thumb activated switches that may be included on the faceplate of head portion 132 of the joystick. Additionally, through extensive testing with a large number of different machine operators, it has been discovered that the illustrated configuration of a recessed portion on a lower edge of head portion 132 adjacent thumb rest 124, such as shown in FIG. 7, improves controllability and reduces stress in the operator's hand when gripping the joystick and twisting the joystick for various functions such as articulation of a motor grader and control of a circle and moldboard.

Handle 120 of left-hand joystick 64 and handle 122 of right-hand joystick 62 may each pivot in at least two directions that are generally orthogonal to each other. In particular, each handle may pivot fore-and-aft about a first horizontal axis and pivot left-and-right about a second horizontal axis. In the disclosed embodiments, the fore/aft pivoting of the handles may be generally aligned with a travel direction of the machine being operated by the joystick, and in some embodiments one or both handles may be normally oriented at an oblique angle relative to the pivoting directions. When the handle is pivoted about a first axis, a first proportional signal may be generated indicative of desired changes to the lifting and lowering of a left side work tool such as a blade by lift cylinders. When the handle is pivoted about a second axis different from the first axis, a second proportional signal may be generated indicative of desired changes to the lifting and lowering of a right side work tool such as a blade by lift cylinders. The handles of each joystick may also be spring-centered (i.e., biased to a neutral position) relative to one or both of the axes about which it can be moved.

One or more additional control devices, such as buttons 112, shown in FIG. 3, may be located at a distal end of the handle on the head of joystick 62 and associated with movement of a work tool. Additionally, a top surface 152, shown in FIG. 7, may be configured with a flat profile to allow an operator to rest their hand on that location and perform machine operations. In various embodiments of one or both of left-hand joystick 64 and right-hand joystick 62, a top surface may be configured as a wide surface with smooth contours such that it provides a comfortable resting place for an operator's hand. Flat surfaces may also be provided on opposing sides of each joystick to allow an operator to grip the control with fingertips for small, precise left-right movements, without having to grip the entire handle of each joystick. Additional controls on the faceplate of each head portion of the joysticks may include a rocker button located gravitationally lower than momentary control elements, while momentary control elements may be linear push buttons arranged in different configurations on the faceplate. It is contemplated that additional and/or different types of control elements may be included on each faceplate, if desired.

Proportional control elements, such as rocker switch 270 of left-hand joystick 64, shown in FIG. 4, and 4-way push button 250 of right-hand joystick 62, shown in FIG. 3, may pivot in at least two directions. When a proportional control element is pivoted about an axis, a proportional signal may be generated indicative of desired operations such as pitching, yawing, or other movements of a work tool by a hydraulic cylinder. Control elements such as rocker switch 270 and 4-way push button 250 may be spring-centered (i.e., biased to a neutral position) relative to one or all of the axes about which they may be pivoted.

Momentary control elements may also be provided on each faceplate of joysticks 64, 62, and may be associated with any known function(s) of the machine and work tool that require operator input. In some implementations, momentary control elements may be associated with work tool movement. For example, one momentary control element could be associated with a tool shake function. In this example, when this particular element is depressed, any one or more cylinders connected to the work tool may be rapidly extended and retracted by a desired amount to cause shaking of the work tool. This function may be selectively activated to shake off any material stuck to the work tool. In one embodiment, the shaking of the work tool may continue as long as a corresponding control element is depressed by the operator. In another embodiment, depressing the control element once may initiate shaking, and depressing the control element a second time may terminate shaking.

In one exemplary embodiment, for example, with a joystick on a motor grader, one or more of control elements located on the faceplate could be associated with a tracked grading operation. In particular, the movements of the work tool such as a circle assembly and moldboard of a motor grader may be automatically tracked and controlled based on a desired contour of a ground surface. Specifically, the work tool could be automatically lifted, pitched, rolled, and/or yawed such that an actual contour of the ground surface substantially matches a desired virtual contour. In this example, the automated tracking and moving of the work tool may be initiated, adjusted, and/or terminated using one or more of the control elements included on one or both faceplates. It is contemplated that these control elements could be used for other or additional purposes, if desired.

The machine that includes joysticks 64, 62 may include a hydraulic system having a plurality of fluid components that cooperate to cause the extending and retracting movements of hydraulic cylinders used to control movement of a work tool or other components of the machine. Specifically, a hydraulic system may include a tank holding a supply of fluid, and a pump configured to pressurize the fluid and selectively direct the pressurized fluid to each of a plurality of hydraulic cylinders. The pump may be connected to the tank via a tank passage, and to each of the hydraulic cylinders via a common supply passage and separate head- and rod-end passages. The tank may be connected to each of the hydraulic cylinders via a common drain passage and head- and rod-end passages. The hydraulic system may also include a plurality of valves located between the hydraulic cylinders and the tank and pump to regulate flows of fluid through the passages.

The valves of the hydraulic system may be disposed within a common or separate valve blocks (not shown) and include, for example, a first valve associated with lift cylinders, and a second valve associated with yaw cylinders, a third valve associated with a pitch cylinder, and a fourth valve associated with a roll cylinder. Each of the valves may be disposed between the head- and rod-end passages of the corresponding cylinder(s) and common supply and drain passages, and take any configuration known in the art (e.g., pilot operated, electro-hydraulic, and/or solenoid operated configurations). Regardless of the configuration of the valves, an element associated with each valve may be movable between a first position at which a main flow of pressurized fluid from a common supply passage is allowed to pass to a head-end pressure chamber of its associated hydraulic cylinder(s) and waste fluid from a rod-end pressure chamber is allowed to pass to a common drain passage, and a second position at which the main flow of pressurized fluid from the common supply passage is allowed to pass to a rod-end pressure chamber and waste fluid from the head-end pressure chamber is allowed to pass to the common drain passage. In some embodiments, the valve element may also be moveable to a third position, at which fluid flow between the different passages is inhibited. In these embodiments, the valve element may be spring-biased toward the third position and urged to any position between the third and first or third and second positions based on a command signal. It is contemplated that additional components may be associated with the valves and/or hydraulic system, if desired, such as pressure compensating valves, check valves, pressure relief valves, pressure regulating valves, load sensing valves, resolvers, etc.

A controller may be in communication with the different components of the hydraulic system and configured to generate the valve command signals discussed above in response to operator input received via a joystick. For example, based on the signals generated by left-hand joystick 64 during pivoting or twisting of handle 120 of joystick 64 and manipulation of control elements mounted on the faceplate at head portion 130 of joystick 64, the controller may be configured to selectively activate different combinations of valves to efficiently carry out operator commands.

The controller may include a memory, a secondary storage device, a clock, and one or more processors that cooperate to accomplish a task consistent with the present disclosure. Numerous commercially available microprocessors can be configured to perform the functions of the controller. It should be appreciated that the controller configured to receive signals generated by movement of each joystick 64, 62 could readily embody a general machine controller capable of controlling numerous other functions of the machine. Various known circuits may be associated with the controller, including signal-conditioning circuitry, communication circuitry, and other appropriate circuitry. It should also be appreciated that the controller may include one or more of an application-specific integrated circuit (ASIC), a field-programmable gate array (FPGA), a computer system, and a logic circuit configured to allow the controller to function in accordance with the present disclosure.

INDUSTRIAL APPLICABILITY

The disclosed input device with left-hand joystick 64 and right-hand joystick 62 may be used with any machine having a work tool that is capable of movement in multiple directions. The joystick may be particularly useful when applied to a machine having a blade where independent control over lifting, pitching, rolling, and yawing is beneficial. Additionally, in other implementations, a remote control operator's station or console including each joystick may allow for control of the speeds and direction of the transmission for the machine as well as steering and travel speed of the machine without the use of foot pedals. Independent control over blade lifting, pitching, rolling, and yawing may be possible through separate regulation of independent hydraulic cylinders under the direction of a machine operator. Operation of an input device according to various disclosed embodiments, in connection with a hydraulic system, will now be described in detail.

Each of a plurality of hydraulic cylinders may be movable by fluid pressure. In particular, fluid may be drawn from a tank, pressurized by a pump, and selectively directed to control valves configured to direct the flow of hydraulic fluid to a common supply passage. In response to an operator manipulation of an input device, an associated controller may selectively generate a command that causes one or more of a number of control valves to move toward a desired position at which the main flow of pressurized fluid is directed to the appropriate one of head- and rod-end pressure chambers of one or more hydraulic cylinders. Substantially simultaneously, the same valve movement may communicate the other of head- and rod-end pressure chambers of the same hydraulic cylinder with a tank via a common drain passage, thereby creating a force differential across a piston assembly within the hydraulic cylinder that causes the piston assembly to move.

For example, if lifting of a work tool such as a blade on a motor grader is commanded by the operator through pivoting of a handle of a joystick in a rearward direction (i.e., through pulling of the handle backward toward the operator) about an axis, a corresponding signal may be generated by the input device and directed to the controller. In response to receiving this signal, the controller may generate a command directed to a control valve, causing one or more rod-end chambers of associated lift cylinders to fill with pressurized fluid and retract piston assemblies. This retraction may function to raise a push frame along with a work tool. In contrast, if lowering of a work tool is commanded by the operator through pivoting of the handle of the joystick in a forward direction (i.e., through pushing of the handle away from the operator), a corresponding signal may be generated by the input device and directed to the controller. In response to receiving this signal, the controller may generate a command directed to the control valve, causing head-end chambers of lift cylinders to fill with pressurized fluid and extend piston assemblies. This extension may function to lower the push frame along with the work tool.

It will be apparent to those skilled in the art that various modifications and variations can be made to the input device of the present disclosure without departing from the scope of the disclosure. Other embodiments will be apparent to those skilled in the art from consideration of the specification and practice of the input device disclosed herein. It is intended that the specification and examples be considered as exemplary only, with a true scope of the disclosure being indicated by the following claims and their equivalent.

What is claimed is:

1. An input device for performing control functions of a machine, the input device comprising:
a left-hand joystick mounted on a left armrest of a seat; and
a right-hand joystick mounted on a right armrest of the seat,
the right-hand joystick including:
a head portion,
a base portion configured to conform to and at least partially cradle a hand, and
a handle extending from the base portion,
a proximal end of the handle being connected to the base portion,
a distal end of the handle supporting the head portion,
the head portion comprising a front surface,
the front surface including a configurable face plate,
the configurable face plate including a roller configured to perform grade control,
the handle including a thumb rest area at the distal end of the handle transitioning into the head portion of the right-hand joystick, and
the thumb rest area including a curved surface configured to follow a curvature of a thumb when in a natural resting position.

2. The input device of claim 1, wherein the left-hand joystick includes a different roller configured to perform continuously variable shifting of a transmission of the machine.

3. The input device of claim 1, wherein the thumb rest area is configured to follow a natural curvature of the hand when the hand is in the natural resting position while gripping the handle at a gripping portion of the handle.

4. The input device of claim 1,
wherein the thumb rest area is configured to enable application of an activating pressure by a thumb of the hand in a forward direction against the right-hand joystick,
wherein the thumb rest area is at a greater distance from the base portion than a gripping portion of the handle, and wherein, in order to generate forward movement of the right-hand joystick, less pressure is required to be applied at the thumb rest area than at the gripping portion of the handle.

5. The input device of claim 1, wherein the handle is configured to pivot in a first direction from a central-biased position to generate a first signal and to pivot in a second direction from the central-biased position to generate a second signal, and wherein the second direction is generally orthogonal to the first direction.

6. The input device of claim 5, wherein the first signal is indicative of a desired amount of movement about a first axis of rotation that is generally horizontal relative to a ground surface under the machine and generally perpendicular relative to a travel direction of the machine, and wherein the second signal is indicative of a desired amount of movement about a second axis of rotation that is generally vertical relative to the ground surface and generally perpendicular relative to the first axis.

7. The input device of claim 1, wherein the left-hand joystick is configured to be moved in forward and rearward directions from a central-biased position in order to generate signals indicative of operator commanded changes in a travel speed of in forward and rearward directions, respectively.

8. The input device of claim 1, wherein the configurable face plate is configured with an asymmetrical outline defined into a lower side portion of the head portion and configured to provide clearance for a thumb of the hand when an operator is gripping the handle as the thumb is moved from the thumb rest area into contact with one or more buttons or rollers disposed on the configurable face plate.

9. The input device of claim 1, wherein the handle comprises flat portions along each of left and right sides of the handle configured to enable leftward and rightward movement of the right-hand joystick with fingertips in contact with the flat portions, and wherein the head portion comprises a top flat surface along an uppermost extent of the head portion configured for use as a rest surface for the hand during movement of the right-hand joystick.

10. An input device, the input device comprising:
a left-hand joystick mounted on a left armrest,
the left-hand joystick being configured to generate signals indicative of commands for at least one of shifting of transmission speeds and direction, change in travel speed, an amount of wheel lean, or steering; and
a right-hand joystick mounted on a right armrest,
the right-hand joystick being configured to generate signals indicative of commands for grade control,
wherein the right-hand joystick comprises:
head portion,
a base portion,
a handle extending from the base portion,
the head portion comprising a front surface including an interchangeable face plate,
the handle comprising a thumb rest area at a distal end of the handle transitioning into the head portion of the right-hand joystick,
the thumb rest area including a curved surface configured to follow a curvature of a thumb of a hand when the hand is in a natural resting position, and the head portion comprising a top flat surface configured for use as a rest surface for the hand during movement of the right-hand joystick.

11. The input device of claim 10, wherein the left-hand joystick comprises a roller configured to perform continuously variable shifting.

12. The input device of claim 10, wherein the thumb rest area is configured to follow a natural curvature of the hand when the hand is in the natural resting position while gripping the handle at a gripping portion of the handle.

13. The input device of claim 10, wherein the thumb rest area is configured to enable application of an activating pressure by a thumb of the hand in a forward direction against the right-hand joystick, wherein the thumb rest area is at a greater distance from the base portion than a gripping portion of the handle, and wherein, in order to generate forward movement of the right-hand joystick, less pressure is required to be applied at the thumb rest area than at the gripping portion of the handle.

14. The input device of claim 10, wherein the handle is configured to pivot in a first direction from a central-biased position to generate a first signal and to pivot in a second direction from the central-biased position to generate a second signal, and wherein the second direction is generally orthogonal to the first direction.

15. The input device of claim 14, wherein the first signal is indicative of a desired amount of movement about a first axis of rotation that is generally horizontal relative to a ground surface and generally perpendicular relative to a travel direction, and to generate the second signal, which is indicative of a desired amount of movement about a second axis of rotation that is generally vertical relative to the ground surface and generally perpendicular relative to the first axis.

16. The input device of claim 10, wherein the left-hand joystick is configured to be moved in forward and rearward directions from a central-biased position in order to generate signals indicative of operator commanded changes in the travel speed in forward and rearward directions, respectively.

17. The input device of claim 10, wherein the interchangeable face plate is configured with an asymmetrical outline defined into a lower side portion of the head portion and configured to provide clearance for a thumb of the hand when an operator is gripping the handle as the thumb is moved from the thumb rest area into contact with one or more buttons or rollers disposed on the interchangeable face plate.

18. The input device of claim 10, wherein the handle comprises flat portions along each of left and right sides of the handle configured to enable leftward and rightward movement of the right-hand joystick with fingertips in contact with the flat portions, and wherein the head portion comprises a top flat surface along an uppermost extent of the head portion configured for use as a rest surface for the hand during movement of the right-hand joystick.

19. An input device, comprising:
a base portion configured to conform to and least partially cradle a hand,
a handle extending from the base portion,
a proximal end of the handle being connected to the base portion, a distal end of the handle supporting a head portion of the input device, the head portion of the input device comprising a front surface including a configurable face plate, the configurable face plate comprising a roller, the handle including a thumb rest area at the distal end of the handle transitioning into the head portion of the input device, and the thumb rest area including a curved surface configured to follow a curvature of a thumb of the hand when the hand is in a natural resting position.

20. The input device of claim 19, wherein the thumb rest area is configured to follow the curvature of the thumb when the hand is in the natural resting position and while the hand is gripping the handle at a gripping portion of the handle.

* * * * *